US006993136B2

(12) United States Patent
Solinas

(10) Patent No.: US 6,993,136 B2
(45) Date of Patent: *Jan. 31, 2006

(54) CRYPTOGRAPHIC KEY EXCHANGE METHOD USING EFFICIENT ELLIPTIC CURVE

(75) Inventor: Jerome Anthony Solinas, Westminster, MD (US)

(73) Assignee: The United States of America as represented by the National Security Agency, Washington, DC (US)

( * ) Notice: Subject to any disclaimer, the term of this patent is extended or adjusted under 35 U.S.C. 154(b) by 871 days.

This patent is subject to a terminal disclaimer.

(21) Appl. No.: 09/928,704

(22) Filed: Aug. 9, 2001

(65) Prior Publication Data

US 2002/0021810 A1 Feb. 21, 2002

Related U.S. Application Data

(60) Provisional application No. 60/226,215, filed on Aug. 18, 2000.

(51) Int. Cl.
*H04L 9/30* (2006.01)

(52) U.S. Cl. .................. 380/278; 380/30; 713/161; 713/171; 713/174

(58) Field of Classification Search .................. 380/28, 380/30, 265, 285, 231, 1; 235/451; 708/491, 708/492, 620, 523; 713/171, 174, 193, 194, 713/161, 500, 189
See application file for complete search history.

(56) References Cited

U.S. PATENT DOCUMENTS 4,200,770 A 4/1980 Hellman et al.

| 5,159,632 A | 10/1992 | Crandall |
| 5,271,061 A | 12/1993 | Crandall |
| 5,463,690 A | 10/1995 | Crandall |
| 5,581,616 A | 12/1996 | Crandall |
| 5,805,703 A | 9/1998 | Crandall |
| 6,049,610 A | 4/2000 | Crandall |

OTHER PUBLICATIONS

J.A. Gordon. Strong primes are easy to find. In T. Beth, N. Coth, and I. Ingermarsson, editors, Advances in Cryptology—EUROCRYPT 84, vol. 209 of Lecture Notes in Computer Science, pp. 216-223. Springer-Verlag, 1985.*

(Continued)

*Primary Examiner*—Emmanuel L. Moise
*Assistant Examiner*—Tamara Teslovich
(74) *Attorney, Agent, or Firm*—Robert D. Morelli

(57) ABSTRACT

A method of exchanging a cryptographic key between two users that includes the steps of selecting a value p from $p=(2^{dk}-2^{ck}-1)/r$, $p=(2^{dk}-2^{(d-1)k}+2^{(d-2)k}- \ldots -2^k+1)/r$, $p=(2^{dk}-2^{ck}-1)/r$, $p=(2^{dk}-2^{ck}+1)/r$, and $p=(2^{4k}-2^{3k}+2^{2k}+1)/r$; selecting an elliptic curve E and an order q; selecting a base point G on the elliptic curve E, where G is of order q; generating a private key w; generating a public key W=wG; distributing p, E, q, G, and W in an authentic manner; agreeing on p, E, q, G, $W_1$, and $W_2$, where $W_1$ is the public key of a first user, and where $W_2$ is the public key of a second users; each users generating a private integer; each users multiplying G by that user's private integer using a form of p agreed upon; each user transmitting the result of the last step to the other user; each users combining that user's private integer and public key with the other user's result of the tenth step and public key using the form of p agreed upon to form a common secret point between the users; and each user deriving the cryptographic key from the common secret point.

1 Claim, 2 Drawing Sheets

OTHER PUBLICATIONS

FIPS PUB 186-2, Jan. 27, 2000, Digital Signature Standard, U.S. Dept. of Commerce (NIST).

Victor S. Miller, "Use of Elliptic Curves in Cryptography", Advances in Cryptography—Crypto 85, LNCS 218, pp. 417-426, 1986.

Neil Kobutz, "A Cource in Number Theory and Cryptography," QA 241.K672, 1987, pp. 150-179.

Peter L. Montgomery, "Modular Multiplication Without Trail Division," Mathematics of Computation, vol. 44, No. 170, pp. 519-521. Apr. 1985.

* cited by examiner

CRYPTOGRAPHIC KEY EXCHANGE METHOD USING EFFICIENT ELLIPTIC CURVE

This application claims the benefit of U.S. Provisional Application No. 60/226,215, filed Aug. 18, 2000.

FIELD OF THE INVENTION

The present invention relates, in general, to cryptography and, in particular, to public key cryptography.

BACKGROUND OF THE INVENTION

Cryptography provides methods of providing privacy and authenticity for remote communications and data storage. Privacy is achieved by encryption of data, usually using the techniques of symmetric cryptography (so called because the same mathematical key is used to encrypt and decrypt the data). Authenticity is achieved by the functions of user identification, data integrity, and message non-repudiation. These are best achieved via asymmetric (or public-key) cryptography.

In particular, public-key cryptography enables encrypted communication between users that have not previously established a shared secret key between them. This is most often done using a combination of symmetric and asymmetric cryptography: public-key techniques are used to establish user identity and a common symmetric key, and a symmetric encryption algorithm is used for the encryption and decryption of the actual messages. The former operation is called key agreement. Prior establishment is necessary in symmetric cryptography, which uses algorithms for which the same key is used to encrypt and decrypt a message. Public-key cryptography, in contrast, is based on key pairs. A key pair consists of a private key and a public key. As the names imply, the private key is kept private by its owner, while the public key is made public (and typically associated to its owner in an authenticated manner). In asymmetric encryption, the encryption step is performed using the public key, and decryption using the private key. Thus the encrypted message can be sent along an insecure channel with the assurance that only the intended recipient can decrypt it.

The key agreement can be interactive (e.g., for encrypting a telephone conversation) or non-interactive (e.g., for electronic mail).

User identification is most easily achieved using what are called identification protocols. A related technique, that of digital signatures, provides data integrity and message non-repudiation in addition to user identification.

The use of cryptographic key pairs was disclosed in U.S. Pat. No. 4,200,770, entitled "CRYPTOGRAPHIC APPARATUS AND METHOD." U.S. Pat. No. 4,200,770 also disclosed the application of key pairs to the problem of key agreement over an insecure communication channel. The algorithms specified in this U.S. Pat. No. 4,200,770 rely for their security on the difficulty of the mathematical problem of finding a discrete logarithm. U.S. Pat. No.4,200,770 is hereby incorporated by reference into the specification of the present invention.

In order to undermine the security of a discrete-logarithm based cryptoalgorithm, an adversary must be able to perform the inverse of modular exponentiation (i.e., a discrete logarithm). There are mathematical methods for finding a discrete logarithm (e.g., the Number Field Sieve), but these algorithms cannot be done in any reasonable time using sophisticated computers if certain conditions are met in the specification of the cryptoalgorithm.

In particular, it is necessary that the numbers involved be large enough. The larger the numbers used, the more time and computing power is required to find the discrete logarithm and break the cryptography. On the other hand, very large numbers lead to very long public keys and transmissions of cryptographic data. The use of very large numbers also requires large amounts of time and computational power in order to perform the cryptoalgorithm. Thus, cryptographers are always looking for ways to minimize the size of the numbers involved, and the time and power required, in performing the authentication algorithms. The payoff for finding such a method is that cryptography can be done faster, cheaper, and in devices that do not have large amounts of computational power (e.g., hand-held smart-cards).

A discrete-logarithm based cryptoalgorithm can be performed in any mathematical setting in which certain algebraic rules hold true. In mathematical language, the setting must be a finite cyclic group. The choice of the group is critical in a cryptographic system. The discrete logarithm problem may be more difficult in one group than in another for which the numbers are of comparable size. The more difficult the discrete logarithm problem, the smaller the numbers that are required to implement the cryptoalgorithm. Working with smaller numbers is easier and faster than working with larger numbers. Using small numbers allows the cryptographic system to be higher performing (i.e., faster) and requires less storage. So, by choosing the right kind of group, a user may be able to work with smaller numbers, make a faster cryptographic system, and get the same, or better, cryptographic strength than from another cryptographic system that uses larger numbers.

The groups which were envisioned in the above-named patents come from a setting called finite fields. A book by N. Koblitz, "A Course in Number Theory and Cryptography," (1987), and a paper by V. Miller, "Use of elliptic curves in cryptography," Advances in Cryptology—CRYPTO 85, LNCS 218, pp. 417–426, 1986, disclose the method of adapting discrete-logarithm based algorithms to the setting of elliptic curves. It appears that finding discrete logarithms in this kind of group is particularly difficult. Thus elliptic curve-based cryptoalgorithms can be implemented using much smaller numbers than in a finite-field setting of comparable cryptographic strength. Thus the use of elliptic curve cryptography is an improvement over finite-field based public-key cryptography.

There are several kinds of elliptic curve settings. These settings have comparable cryptographic strength and use numbers of comparable size. However, these settings differ in the amount of computation time required when implementing a cryptoalgorithm. Cryptographers seek the fastest kind of elliptic curve based cryptoalgorithms.

More precisely, an elliptic curve is defined over a field F. An elliptic curve is the set of all ordered pairs (x,y) that satisfy a particular cubic equation over a field F, where x and y are each members of the field F. Each ordered pair is called a point on the elliptic curve. In addition to these points, there is another point O called the point at infinity. The infinity point is the additive identity (i.e., the infinity point plus any other point results in that other point). For cryptographic purposes, elliptic curves are typically chosen with F as the integers mod p for some large prime number p (i.e., Fp) or as the field of $2^m$ elements.

To carry out an elliptic curve-based key agreement procedure, it is necessary to perform a sequence of operations involving points on the curve and the equation of the curve.

Each of these operations is carried out via arithmetic operations in the field F, namely addition, subtraction, multiplication, and division. If F is the set of integers mod p, then the simplest and most common way to carry out the arithmetic operations is to use ordinary integer arithmetic along with the process of reduction modulo p. This last process is called modular reduction.

Modular reduction is the most expensive part of the arithmetic operations in the field Fp. Therefore, the efficiency of an elliptic curve algorithm is enhanced when the cost of modular reduction is reduced. There are two common ways of doing this.

The first way is to avoid explicit modular reduction altogether by using an alternative method of carrying out the arithmetic operations in the field Fp. This was first proposed by P. Montgomery in the paper "Modular multiplication without trial division," Mathematics of Computation, 44 (1985), pp. 519–521. This method has the advantage that it can be applied to both elliptic and non-elliptic cryptoalgorithms.

The second way is to choose the prime modulus p in such a way that modular reduction is particularly easy and efficient. This approach yields faster elliptic curve algorithms than the first approach, but does not apply to non-elliptic cryptoalgorithms.

More specifically, suppose that one needs to reduce an integer b modulo p. Typically, b is a positive integer less than the square of the modulus p. In the general case, the best way to reduce b modulo p is to divide b by p; the result is a quotient and a remainder. The remainder is the desired quantity. The division step is the most expensive part of this process. Thus the prime modulus p is chosen to avoid the necessity of carrying out the division.

The simplest and best-known choice is to let p be one less than a power of two. Such primes are commonly called Mersenne primes. Because of the special form of a Mersenne prime p, it is possible to replace the division step of the modular reduction process by a single modular addition. A modular addition can be carried out using one or two integer additions, and so is much faster than an integer division. As a result, reduction modulo a Mersenne prime is much faster than in the general case.

A larger class of primes which contains the Mersenne primes as a special case is the class of pseudo-Mersenne primes. These include the Crandall primes and the Gallot primes. The Crandall primes are those of the form $2^m \pm C$, where C is an integer less than $2^{32}$ in absolute value. The Gallot primes are of the form $k*2^m \pm C$, where both k and C are relatively small.

U.S. Pat. No. 5,159,632, entitled "METHOD AND APPARATUS FOR PUBLIC KEY EXCHANGE IN A CRYPTOGRAPHIC SYSTEM"; U.S. Pat. No. 5,271,061, entitled "METHOD AND APPARATUS FOR PUBLIC KEY EXCHANGE IN A CRYPTOGRAPHIC SYSTEM"; U.S. Pat. No. 5,463,690, entitled "METHOD AND APPARATUS FOR PUBLIC KEY EXCHANGE IN A CRYPTOGRAPHIC SYSTEM"; U.S. Pat. No. 5,581,616, entitled "METHOD AND APPARATUS FOR DIGITAL SIGNATURE AUTHENTICATION"; U.S. Pat. No. 5,805,703, entitled "METHOD AND APPARATUS FOR DIGITAL SIGNATURE AUTHENTICATION"; and U.S. Pat. No. 6,049,610, entitled "METHOD AND APPARATUS FOR DIGITAL SIGNATURE AUTHENTICATION"; each disclose the use of a class of numbers in the form of $2^q-C$ which make modular reduction more efficient and, therefore, make cryptographic methods such as key exchange and digital signatures more efficient. The present invention does not use a class of numbers in the form of $2^q-C$. U.S. Pat. Nos. 5,159,632; 5,271,061; 5,463,690; 5,581,616; 5,805,703; and 6,049,610 are hereby incorporated by reference into the specification of the present invention.

Federal Information Processing Standards Publication 186-2 (i.e., FIPS PUB 186-2) discloses a digital signature standard. In the appendix of FIPS PUB 186-2 are recommended elliptic curves for a 192-bit, a 224-bit, a 256-bit, a 384-bit, and a 521-bit digital signature. The elliptic curves disclosed in FIPS PUB 186-2 are different from the elliptic curves used in the present invention.

SUMMARY OF THE INVENTION

It is an object of the present invention to securely exchange a cryptographic key between two users over a public channel.

It is another object of the present invention to securely exchange a cryptographic key between two users over a public channel based on the discrete logarithm problem.

It is another object of the present invention to securely exchange a cryptographic key between two users over a public channel based on the discrete logarithm problem and using a modulus p of the form selected from the following forms:

$$p=(2^{dk}-2^{ck}-1)/r,$$

where $0<2c<=d$, where r is not equal to 1, and where $GCD(c,d)=1$, where GCD is a function that returns the greatest common denominator of the variables in parenthesis;

$$p=(2^{dk}-2^{(d-1)k}+2^{(d-2)k}-\ldots-2^k+1)/r,$$

where d is even, and where k is not equal to 2 (mod 4);

$$p=(2^{dk}-2^{ck}-1)/r,$$

where $3d<6c<4d$, and where $GCD(c,d)=1$;

$$p=(2^{dk}-2^{ck}+1)/r,$$

where $0<2c<=d$, where r is not equal to 1, and where $GCD(c,d)=1$; and $$p=(2^{4k}-2^{3k}+2^{2k}+1)/r.$$

The present invention is a method of performing a cryptographic key exchange on an elliptic curve in an efficient manner (i.e., in fewer steps than the prior art), using a modulus p in a form selected from the following forms:

$$p=(2^{dk}-2^{ck}-1)/r,$$

where $0<2c<=d$, where r is not equal to 1, and where $GCD(c,d)=1$;

$$p=(2^{dk}-2^{(d-1)k}+2^{(d-2)k}-\ldots-2^k+1)/r,$$

where d is even, and where k is not equal to 2 (mod 4);

$$p=(2^{dk}-2^{ck}-1)/r,$$

where $3d<6c<4d$, and where $GCD(c,d)=1$;

$$p=(2^{dk}-2^{ck}+1)/r,$$

where $0<2c<=d$, where r is not equal to 1, and where $GCD(c,d)=1$; and $$p=(2^{4k}-2^{3k}+2^{2k}+1)/r.$$

If r=1, in those instances where r can be equal to 1, then p is a prime number. Otherwise, p may not be a prime number. If r is a small number then p is almost a prime number.

Each user that wishes to establish a cryptographic key with another user must select parameters according to the following steps.

The first step is selecting a value p from the group of equations as follows:

$$p=(2^{dk}-2^{ck}-1)/r;$$

where $0<2c<=d$, where r is not equal to 1, and where $GCD(c,d)=1$;

$$p=(2^{dk}-2^{(d-1)k}+2^{(d-2)k}-\ldots-2^k+1)/r;$$

where d is even, and where k is not equal to 2 (mod 4);

$$p=(2^{dk}-2^{ck}-1)/r;$$

where $3d<6c<4d$, and where $GCD(c,d)=1$;

$$p=(2^{dk}-2^{ck}+1)/r;$$

where $0<2c<=d$, where r is not equal to 1, and where $GCD(c,d)=1$; and $$p=(2^{4k}-2^{3k}+2^{2k}+1)/r.$$

The second step is selecting an elliptic curve E and an order q.

The third step is selecting a base point $G=(G_x, G_y)$ on the elliptic curve E, where G is of order q.

The fourth step is generating a private key w, where w is an integer.

The fifth step is generating a public key $W=wG$, where W is the user's public key, where w is the user's private key, and where G is the user's basepoint.

The sixth step is distributing, in an authentic manner, p, E, q, G, and W.

Two users who have performed the above-identified steps and wish to establish a cryptographic key between themselves must do the following steps.

The seventh step is for the two users to agree upon parameters p, E, q, G, $W_1$, and $W_2$, where $W_1$ is the first user's public key, and where $W_2$ is the second user's public key.

The eighth step is for each user to generate a private integer.

The ninth step is for each user to multiply the basepoint G by their private integer generated in the last step using the form of modulus p selected in the first step. That is, modular reduction follows the form of the modulus p agreed upon.

The tenth step is for each user to transmit their result of the last step to the other user.

The eleventh step is for each user to combine its private integer and public key with the other user's value received in the tenth step and the other user's public key using the form of the modulus p agreed upon to form a common secret point between the two users.

The twelfth step is for each user to derive the same cryptographic key from the common secret point.

DETAILED DESCRIPTION

The present invention is a method of performing a cryptographc key exchange on an elliptic curve in an efficient manner (i.e., in fewer steps than the prior art), using a modulus p in the form selected from the following forms:

$$p=(2^{dk}-2^{ck}-1)/r;$$

where $0<2c<=d$, where r is not equal 1, and where $GCD(c,d)=1$;

$$p=(2^{dk}-2^{(d-1)k}+2^{(d-2)k}-\ldots-2^k+1)/r;$$

where d is even, and where k is not equal to 2 (mod 4);

$$p=(2^{dk}-2^{ck}-1)/r;$$

where $3d<6c<4d$, and where $GCD(c,d)=1$;

$$p=(2^{dk}-2^{ck}+1)/r;$$

where $0<2c<=d$, where r is not equal 1, and where $GCD(c,d)=1$; and $$p=(2^{4k}-2^{3k}+2^{2k}+1)/r.$$

If r=1, in those places where r can be equal to 1, then p is a prime number. Otherwise, p might not be a prime number. If r is a small number then p is almost a prime number.

It has long been known that certain integers are particularly well suited for modular reduction. The best known examples are the Mersenne numbers $p=2^k-1$. In this case, the integers (mod p) are represented as k-bit integers. When performing modular multiplication, one carries out an integer multiplication followed by a modular reduction. One thus has the problem of reducing modulo p a 2 k-bit number. Modular reduction is usually done by integer division, but this is unnecessary in the Mersenne case. Let $n<p^2$ be the integer to be reduced (mod p). Let T be the integer represented by the k most significant bits of n, and U the k least significant bits; thus $$n=2^k T+U,$$

with T and U each being k-bit integers. Then $$n=T+U(\text{mod } p).$$

Thus, the integer division by m can be replaced by an addition (mod p), which is much faster.

The main limitation on this scheme is the special multiplicative structure of Mersenne numbers. The above technique is useful only when one intends to perform modular arithmetic with a fixed long-term modulus. For most applications of this kind, the modulus needs to have a specific multiplicative structure, most commonly a prime number. The above scheme proves most useful when k is a multiple of the word size of the machine. Since this word size is typically a power of 2, one must choose k which is highly composite. Unfortunately, the Mersenne numbers arising from such k are never prime numbers. It is, therefore, of interest to find other families of numbers that contain prime numbers or almost prime numbers.

One such family is $2^k-c$, for c positive, which is disclosed in U.S. Pat. Nos. 5,159,632; 5,271,061; 5,463,690; 5,581,616; 5,805,703; and 6,049,610 listed above. The present invention discloses the use of other families of numbers.

Figure 1:
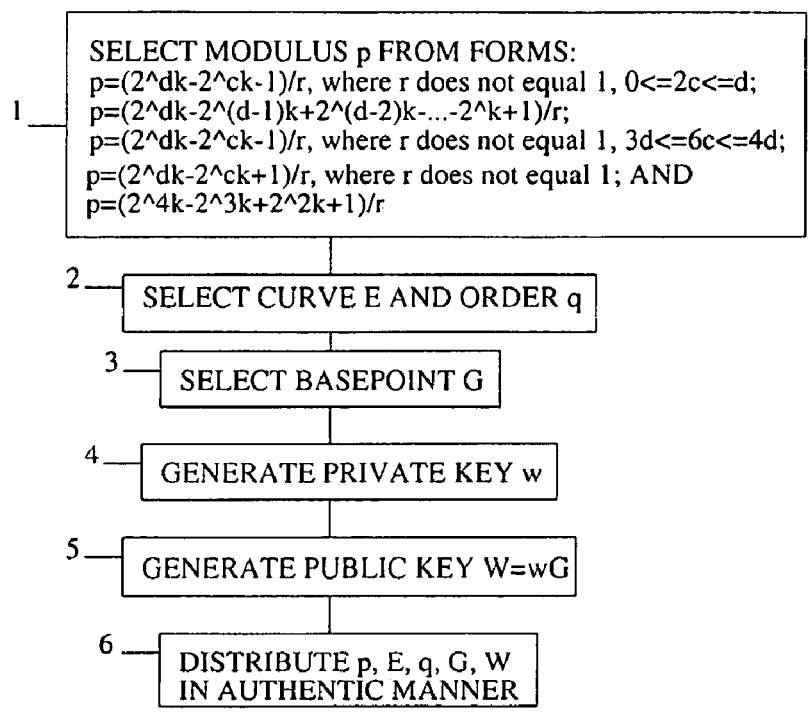
FIG. 1 is a list of parameter selection steps that each user must do.

FIG. 1 is a list of steps for selecting parameters that each user must do. The first step 1 of the present method is for a user to select a modulus p from the group of equations as follows:

$$p=(2^{dk}-2^{ck}-1)/r;$$

where $0<2c<=d$, where r is not equal 1, and where $GCD(c,d)=1$;

$$p=(2^{dk}-2^{(d-1)k}+2^{(d-2)k}-\ldots-2^k+1)/r;$$

where d is even, and where k is not equal to 2 (mod 4);

$$p=(2^{dk}-2^{ck}-1)/r;$$

where $3d<6c<4d$, and where $GCD(c,d)=1$;

$$p=(2^{dk}-2^{ck}+1)/r;$$

where $0<2c<=d$, where r is not equal 1, and where $GCD(c,d)=1$; and $$p=(2^{4k}-2^{3k}+2^{2k}+1)/r.$$

The second step 2 of the present method is selecting an elliptic curve E and an order q.

The third step 3 of the present method selecting a base point $G=(G_x, G_y)$ on the elliptic curve E, where G is of order q.

The fourth step 4 of the present method is generating a private key w, where w is an integer.

The fifth step 5 of the present method is generating a public key W=wG, where W is the user's public key, where w is the user's private key, and where G is the user's basepoint.

The sixth step 6 of the present method is distributing, in an authentic manner (e.g., courier, secure channel, etc.), p, E, q, G, and W.

Figure 2:
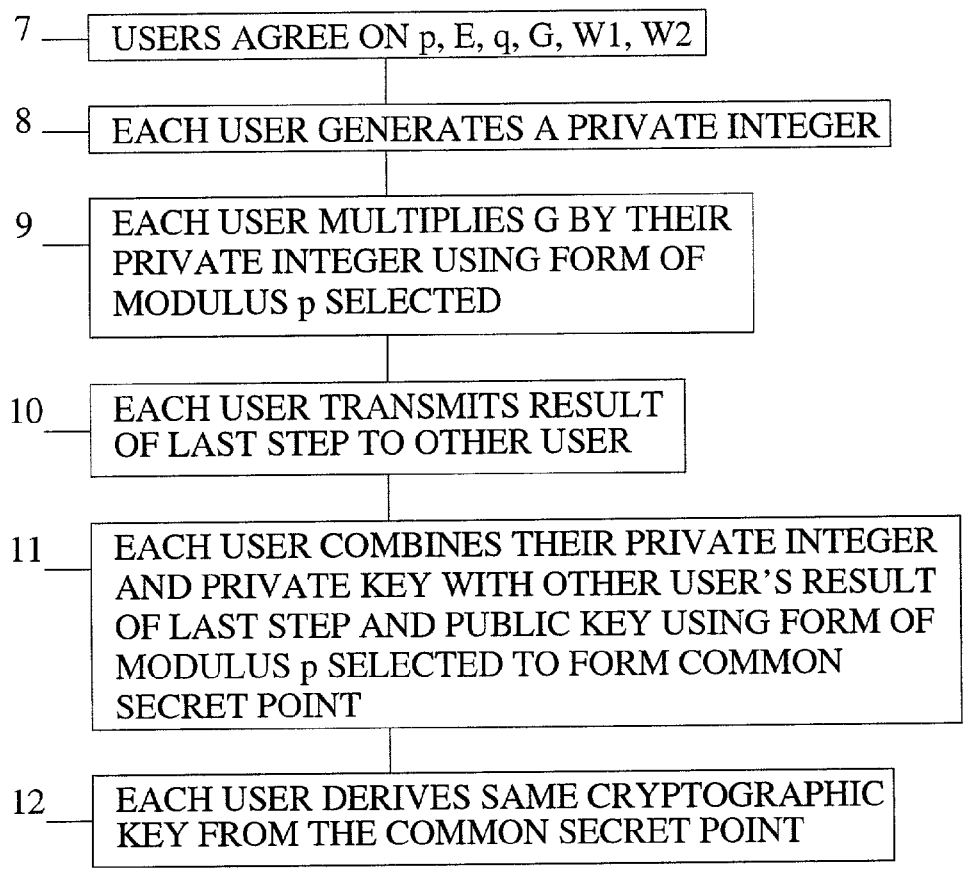
FIG. 2 is a list of steps for exchanging a cryptographic key between two users.

After two users have selected and distributed their parameters as in the steps of FIG. 1, the two users may establish a cryptographic key between themselves using a non-secure channel using the steps listed in FIG. 2.

The seventh step 7 of the present method of FIG. 2 is for two users who wish to establish a common secret cryptographic key between themselves to agree upon parameters p, E, q, G, $W_1$, and $W_2$, where $W_1$ is the public key of the first user, and where $W_2$ is the public key of the second user.

The eighth step 8 of the present method is for each user to generate a private integer.

The ninth step 9 of the present method is for each user to multiply the basepoint G by their private integer generated in the last step using the form of modulus p agreed upon. Any modular reduction performed in the present invention must be done in the form of modulus p.

The tenth step 10 of the present method of FIG. 2 is for each user to transmit their result of the last step to the other user.

The eleventh step 11 of the present method is for each user to combine its private integer and public key with the other user's value received in the tenth step 10 and the other user's public key using the form of modulus p to form, for both users, a common secret point.

The twelfth step 12 of the present method of FIG. 2 is for each user to derive the same cryptographic key from the common secret point.

invention claimed is:

1. A method of exchanging a cryptographic key between two users, comprising the steps of:
   a) each of said two users selecting a value p from the group of equations consisting of:

$$p=(2^{dk}-2^{ck}-1)/r;$$

where $0<2c<=d$, where r is not equal 1, and where $GCD(c,d)=1$;

$$p=(2^{dk}-2^{(d-1)k}+2^{(d-2)k}-\ldots-2^k+1)/r;$$

where d is even, and where k is not equal to 2 (mod 4);

$$p=(2^{dk}-2^{ck}-1)/r;$$

where $3d<6c<4d$, and where $GCD(c,d)=1$;

$$p=(2^{dk}-2^{ck}+1)/r;$$

where $0<2c<=d$, where r is not equal 1, and where $GCD(c,d)=1$; and $$p=(2^{4k}-2^{3k}+2^{2k}+1)/r;$$

b) each of said two users selecting an elliptic curve E and an order q;
   c) each of said two users selecting a base point $G=(G_x, G_y)$ on the elliptic curve E, where G is of order q;
   d) each of said two users generating a private key w, where w is an integer;
   e) each of said two users generating a public key W=wG, where W is the corresponding user's public key, where w is the corresponding user's private key, and where G is the corresponding user's basepoint;
   f) each of said two users distributing their p, E, q, G, and W in an authentic manner;
   g) the two users agreeing on p, E, q, G, $W_1$, and $W_2$, where $W_1$ is the public key of one of said two users, and where $W_2$ is the public key of the other of said two users;
   h) each of said two users generating a private integer;
   i) each of said two users multiplying G by each of said user's private integer generated in the last step using a form of p agreed upon;
   j) each of said two users transmitting the result of the last step to the other of said two users;
   k) each of said two users combining one of said two user's private integer and public key with the other of said two user's result of step (j) and public key using the form of p agreed upon to form a common secret point between each of said two users; and
   l) each of said two users deriving the cryptographic key from the common secret point.

* * * * *